（12）United States Patent
Niewiadomski et al.

(10) Patent No.: US 11,605,295 B2
(45) Date of Patent: Mar. 14, 2023

(54) ACTIVE HMI COACHING TO ASSIST IN THE RETREAT FROM A PENDING TRAILER FLANK CONTACT

(71) Applicant: Ford Global Technologies, LLC, Dearborn, MI (US)

(72) Inventors: Luke Niewiadomski, Dearborn, MI (US); Li Xu, Bloomfield Hills, MI (US); Seyed Armin Raeis Hosseiny, Canton, MI (US); Bo Bao, Bloomfield, MI (US); Alexander Lee Hunton, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 123 days.

(21) Appl. No.: 17/151,735

(22) Filed: Jan. 19, 2021

(65) Prior Publication Data
US 2022/0230544 A1 Jul. 21, 2022

(51) Int. Cl.
*B60D 1/30* (2006.01)
*G08G 1/16* (2006.01)
*B62D 15/02* (2006.01)
*B60W 20/10* (2016.01)

(52) U.S. Cl.
CPC ............. *G08G 1/16* (2013.01); *B62D 15/029* (2013.01); *B62D 15/0265* (2013.01)

(58) Field of Classification Search
CPC ......... B60D 1/30; B60W 20/10; B60W 10/20; B60W 10/04
See application file for complete search history.

(56) References Cited

U.S. PATENT DOCUMENTS 7,109,854 B2   9/2006   Dobler et al.
9,037,349 B2   5/2015   Trombley et al.
9,168,951 B2 * 10/2015   Chiu ................. B62D 13/06
(Continued)

FOREIGN PATENT DOCUMENTS

DE   102014107917 A1   9/2015
WO      2020079092 A1   4/2020

OTHER PUBLICATIONS

Svenson, Alrik L. et al., "Development of a Basic Safety Message for Tractor-Trailers for Vehicle-to-Vehicle Communications," Paper No. 15-0379, www.esv.nhtsa.dot.gov/proceedings, Jun. 2015, 12 pages.

*Primary Examiner* — Tan Q Nguyen
(74) *Attorney, Agent, or Firm* — Frank Lollo; Price Heneveld LLP

(57) ABSTRACT

A trailer flank object contact avoidance system for a vehicle towing a trailer includes a sensor system configured to detect objects in an operating environment of the vehicle and a controller. The controller processes information received from the sensor system to monitor a relative position of at least one object with respect to the vehicle during driving and determines an instantaneous path of the trailer based on a vehicle steering angle and whether the instantaneous path of the trailer would bring the trailer into contact with the at least one object. The controller issues a coaching notification to the driver that reverse driving is required to prevent contact between the trailer and the vehicle when a corrective steering angle cannot prevent contact of the trailer with the at least one object during forward driving.

20 Claims, 8 Drawing Sheets

(56) References Cited

U.S. PATENT DOCUMENTS

| | | | |
|---|---|---|---|
| 9,193,387 B2 | 11/2015 | Auer | |
| 9,340,228 B2 | 5/2016 | Xu et al. | |
| 9,493,187 B2 | 11/2016 | Pilutti et al. | |
| 9,499,200 B2 | 11/2016 | Hochrein et al. | |
| 9,511,799 B2 | 12/2016 | Lavoie | |
| 9,527,528 B1 | 12/2016 | Harrison | |
| 9,821,845 B2* | 11/2017 | Xu | B62D 13/06 |
| 9,849,911 B2 | 12/2017 | Lee et al. | |
| 10,118,611 B2 | 11/2018 | Chaney, Jr. et al. | |
| 2014/0303847 A1* | 10/2014 | Lavoie | B62D 15/0275 |
| | | | 701/41 |
| 2016/0152263 A1* | 6/2016 | Singh | B60T 8/1708 |
| | | | 701/41 |
| 2017/0363728 A1 | 12/2017 | Prasad et al. | |
| 2018/0299885 A1* | 10/2018 | Herzog | B60R 1/00 |
| 2018/0319401 A1* | 11/2018 | Herzog | G05D 1/0212 |
| 2019/0064831 A1* | 2/2019 | Gali | G01C 21/3664 |
| 2019/0118860 A1 | 4/2019 | Gali et al. | |
| 2019/0210418 A1 | 7/2019 | Hall et al. | |

\* cited by examiner

ACTIVE HMI COACHING TO ASSIST IN THE RETREAT FROM A PENDING TRAILER FLANK CONTACT

FIELD OF THE DISCLOSURE

The present disclosure generally relates to an advanced driver assistance system for a vehicle. More specifically, the system includes a coaching system for avoidance of trailer flank object contact for a vehicle towing a trailer.

BACKGROUND OF THE DISCLOSURE

Some advanced driver assistance system ("ADAS") features provide an instruction when an upcoming contact is anticipated between an object and the side of a towed trailer. Such systems may be able to use sensors to detect the vehicle surroundings and trailer position, combined with an algorithm to predict upcoming trailer flank contacts, and issue an indication system in the vehicle human-machine interface ("HMI"). When towing a trailer around a tight turn, such features may detect a potential contact of an object with the side of the trailer and provides an instruction to help the driver mitigate the contact by widening the steering path. However, once the trailer is too near to the object, the vehicle can no longer move the trailer away from the object by forward towing. Accordingly, additional system improvements may be warranted.

SUMMARY OF THE DISCLOSURE

According to one aspect of the present disclosure, a trailer flank object contact avoidance system for a vehicle towing a trailer includes a sensor system configured to detect objects in an operating environment of the vehicle and a controller. The controller processes information received from the sensor system to monitor a relative position of at least one object with respect to the vehicle during driving and determines an instantaneous path of the trailer based on a vehicle steering angle and whether the instantaneous path of the trailer would bring the trailer into contact with the at least one object. The controller issues a coaching notification to the driver that reverse driving is required to prevent contact between the trailer and the vehicle when a corrective steering angle cannot prevent contact of the trailer with the at least one object during forward driving.

Embodiments of the first aspect of the invention can include any one or a combination of the following features:
 The controller issues an initial notification to the driver upon determining that the object is within a threshold distance of a side of the trailer and that the instantaneous path of the trailer would bring the trailer into contact with the at least one object.
 The initial notification indicates the corrective steering angle to avoid the potential contact between the trailer and the vehicle during forward driving.
 The coaching notification includes an instruction to shift the vehicle into reverse and indicates a reversing steering angle to move the trailer away from the object.
 The instruction and the indication in the coaching notification are delivered simultaneously.
 The instruction and the indication in the coaching notification may be delivered sequentially.
 The coaching indication further includes a forward driving instruction including a forward driving instruction and an indication of a forward steering angle subsequently determined to continue to move the trailer away from the object.
 The instantaneous path of the trailer corresponds with a width of the trailer.

According to another aspect of the present disclosure, a vehicle includes a steering system including steered wheels, a sensor system configured to detect objects in an operating environment of the vehicle, and a controller processing information received from the sensor system to monitor a relative position of at least one object with respect to the vehicle during driving. The controller further determines an instantaneous path of the trailer based on a steering angle of the steered wheels and whether the instantaneous path of the trailer would bring the trailer into contact with the at least one object and issues a coaching notification to the driver that reverse driving is required to prevent contact between the trailer and the vehicle when a corrective steering angle cannot prevent contact of the trailer with the at least one object during forward driving.

According to another aspect of the present disclosure, a method for assisting a driver towing a trailer with a vehicle in avoiding contact between a flank of the towed trailer and an object includes detecting an object in an operating environment of the vehicle and monitoring a relative position of the object with respect to the vehicle during driving. The method also includes determining an instantaneous path of the trailer based on a vehicle steering angle and whether the instantaneous path of the trailer would bring the trailer into contact with the at least one object and issuing a coaching notification that reverse driving is required to prevent contact between the trailer and the vehicle when a corrective steering angle cannot prevent contact of the trailer with the at least one object during forward driving.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
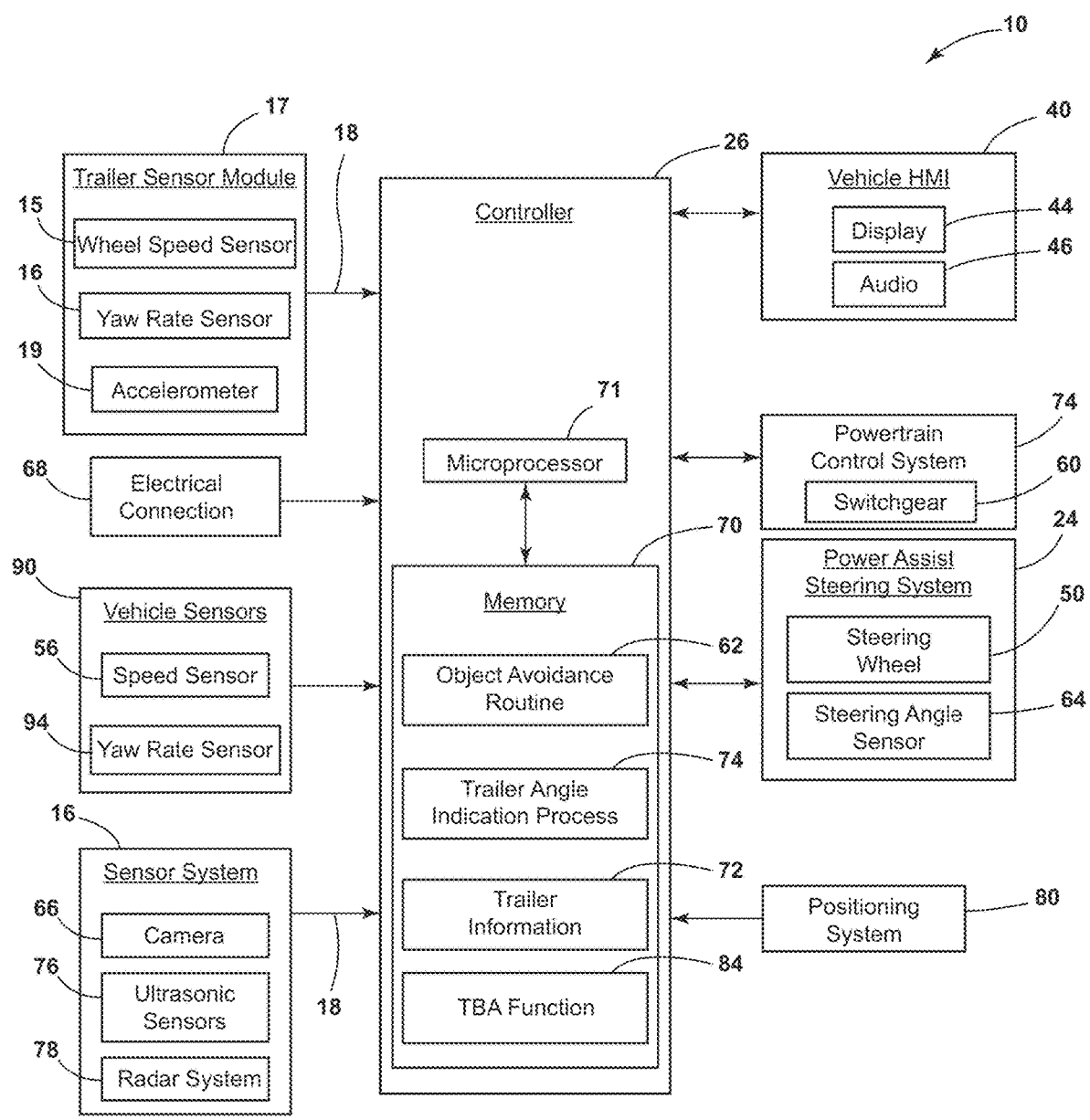
FIG. 1 is a schematic diagram of a trailer flank object avoidance system according to the present disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, reference numeral 10 generally designates a trailer flank object contact avoidance system for a vehicle 12 towing a trailer 14. The system 10 includes a sensor system 16 configured to detect objects O in an operating environment E of the vehicle 12 and a controller 26. The controller 26 processes information (e.g. in the form of sensor data 18) received from the sensor system 16 to monitor a relative position ($x_O$, $y_O$ in FIG. 7) of at least one object O with respect to the vehicle 12 during driving and determines an instantaneous path 20 of the trailer 14 based on a vehicle 12 steering angle δ and whether the instantaneous path 20 of the trailer 14 would bring the trailer 14 into contact with the at least one object O. The controller 26 issues a coaching notification 22 to the driver that reverse driving is required when a maximum possible corrective steering angle δ does not result in a trailer 14 path 20 that moves the trailer 14 away from the object O during forward driving.

Figure 2:
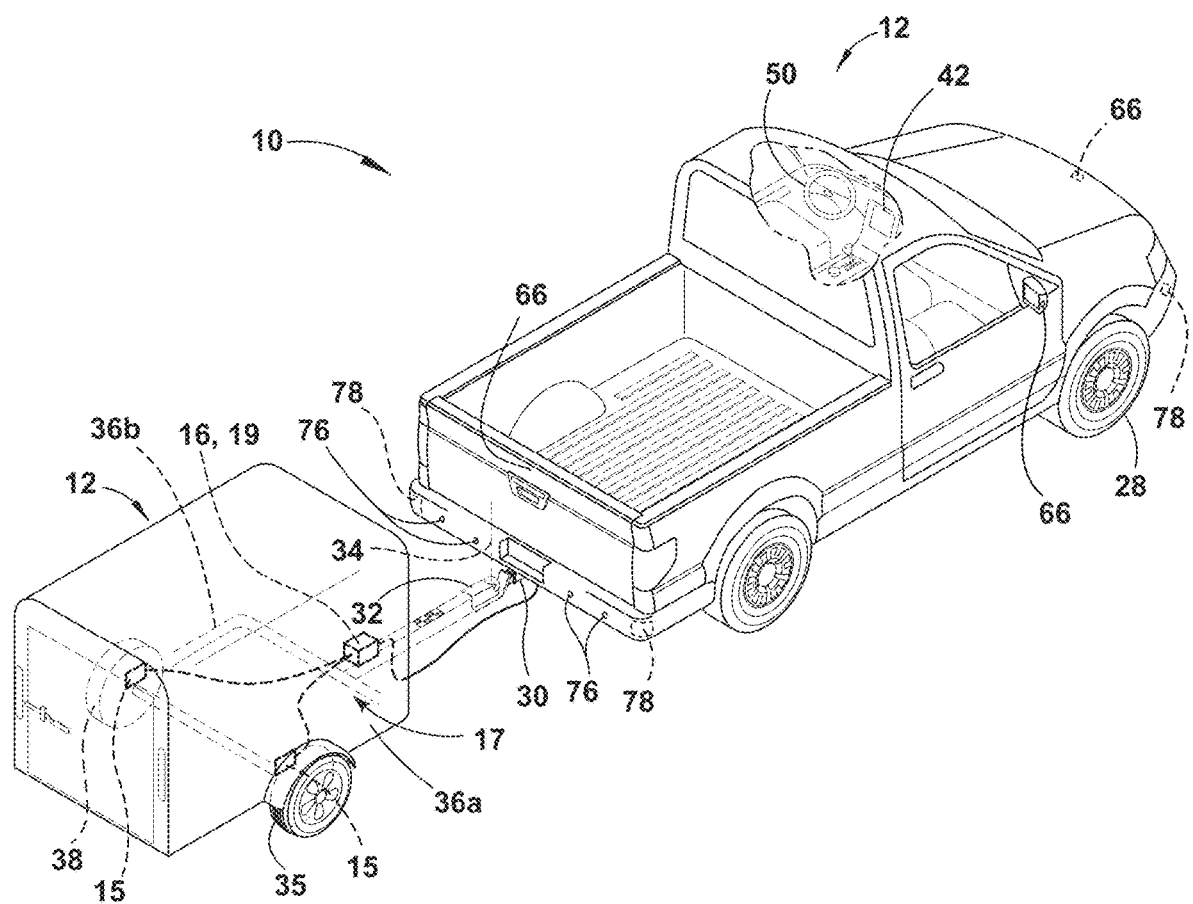
FIG. 2 is a perspective view of an example vehicle and trailer combination that includes the system of the present disclosure.

As shown in FIG. 2, the exemplary vehicle 12 in which system 10 is included has a steering system 24 including steered wheels 28 and a number of sensors within the above-mentioned sensor system 16 to detect objects O in the operating environment E, as defined within a predetermined area surrounding vehicle 12. The vehicle includes a trailer hitch 30 with which the trailer 14 is connected using a coupler 32 to rotate with respect to vehicle 12 about coupling point 34. In this manner, the controller 12 determines the instantaneous path 20 of the trailer 14 based on the steering angle δ of the steered wheels 28 and in view of a kinematic model of the vehicle-trailer combination, as described further below.

Figure 3:
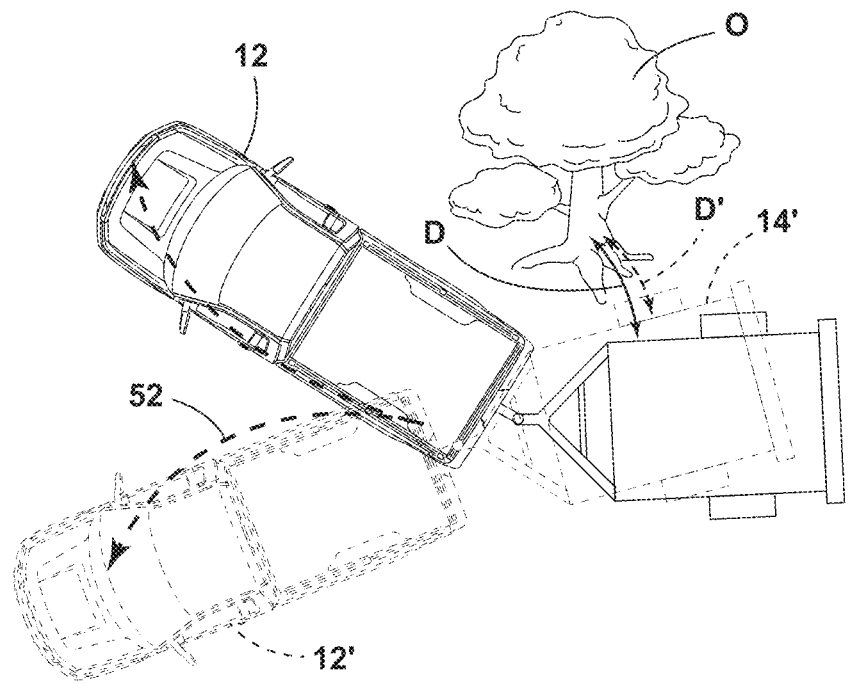
FIG. 3 is an overhead view of a vehicle towing a trailer in a scenario where the trailer flank is approaching an object, along with a depiction of a forward-driving corrective path that can move the trailer away from the object.
Figure 4:
FIG. 4 is an example of an initial indication that can be issued by the system to notify the driver of the available forward-driving corrective path.
Figure 5:
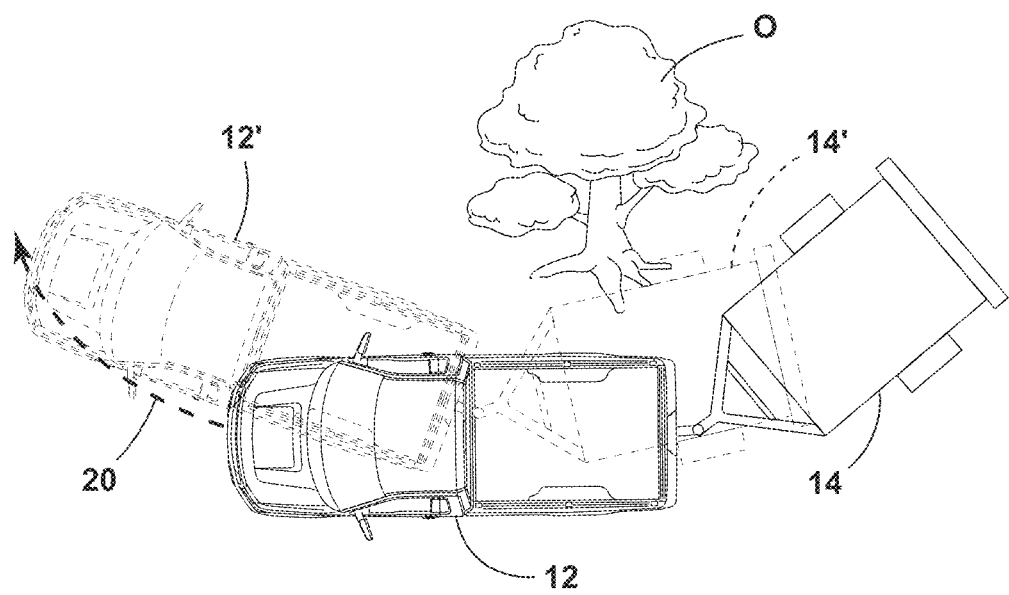
FIG. 5 is an overhead view of a vehicle towing a trailer in a scenario where the trailer flank is approaching an object, along with a depiction of current forward-driving path that will move the trailer further toward the object to a position where reverse driving is needed to avoid contact.

As shown in FIG. 3, the system 10 is primarily configured to monitor for contact of a "flank" 36a or 36b of the trailer 14 with a fixed object O. As shown, the flank 36a, 36b of the trailer 14 generally corresponds to either the left or right side of the trailer 14 forward of the trailer wheels 38. This type of contact most often occurs during a tight turn (i.e., at a steering angle δ approaching a maximum steering angle $δ_{max}$ of the vehicle 12), as the trailer 14 path 20 generally tracks along a tighter curvature than that of vehicle 12. The driver can avoid these contact events in advance by widening the steering curvature, or in other words, by decreasing the steering angle δ toward zero and, potentially toward a steering angle δ in the opposite direction (i.e., along a corrective steering path 52). As shown in FIG. 4, in the present system 10, the controller 26 issues an initial notification 40 to the driver, such as by way of a visual message on the vehicle HMI 42 display 44 and/or an audible message through either the vehicle audio system 46 or through a general audio indication system 48 within vehicle 12, upon determining that the object O is within a threshold distance $D_t$ of one of the flanks 36a or 36b of the trailer 14 and that the instantaneous path 20 of the trailer 14 would bring the trailer into contact with the at least one object O, which may be indicated by the path 20 being determined to cause the distance D between the flank 36a or 36b to decrease. The initial notification 40 indicates the corrective steering angle δ to avoid the potential contact between the trailer 14 and the object O during forward driving, which may be represented by a direction that the steering wheel 50 should be turned to decrease the steering angle δ. As shown in FIG. 5, if the path 20 is not widened by an effective amount soon enough, such that the vehicle 12 continues along a path 20 that either continues to move trailer 14 toward the object O or otherwise does not move trailer 14 away from the object O, a point will be reached where the trailer 14 can only be moved away from the object by reversing the vehicle 12 and trailer 14 combination. In such a condition, any path 20 traversed by forward movement of the vehicle 12 and trailer 14 would result in the trailer 14 contacting the object O.

To prevent the trailer 14 from ultimately contacting the object O in the scenario of FIG. 5, the system 10 is configured to determine when the vehicle 12 and trailer 14 combination is in such a situation before contact occurs. In particular, during forward motion of the vehicle 12 towing the trailer 14, the system 10 monitors for a condition when no path 20 will provide clearance around the detected object O under further forward driving. In general, this is done by determining a corrective path 52 for the trailer 14 that would be taken by continued forward movement of the vehicle 12 at a corrective steering angle δ that corresponds with the maximum steering angle $δ_{max}$ of the vehicle 12 in the direction opposite the side of trailer 14 on which the object O is present. The system 10 monitors the corrective path 52 relative to the object O and determines that the corrective steering angle cannot move the trailer away from the object O when the object O is within the corrective path 52. When it is determined that the object O is within the corrective path 52, system 10, by way of controller 26, provides the above-mentioned coaching notification 22, which may include instructions on how the driver can reverse the vehicle 12 and trailer 14 out of the potential contact situation and, in a particular application, may provide a menu shortcut for the driver to activate a trailer backup assist feature of the vehicle to assist the driver in making the reversing maneuver suggested by system 10.

Figure 6A:
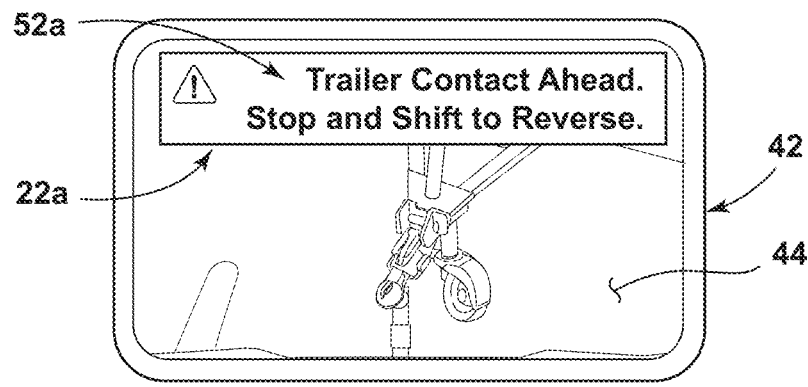
FIGS. 6A-6D are example views of coaching notifications issued by the system to direct reversing of the vehicle to move the trailer away from the object.
Figure 6B:
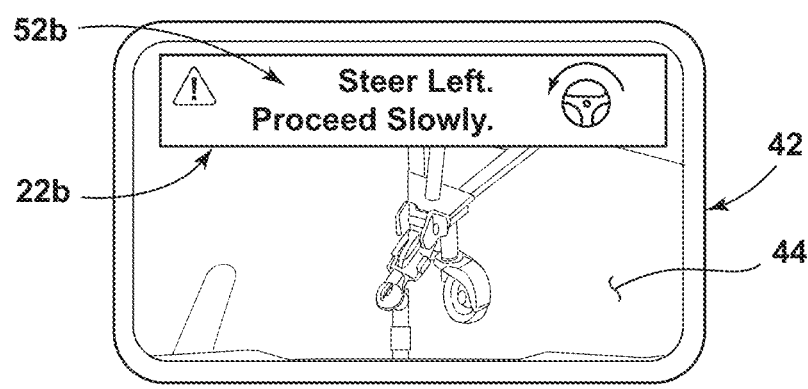
Figure 6C:
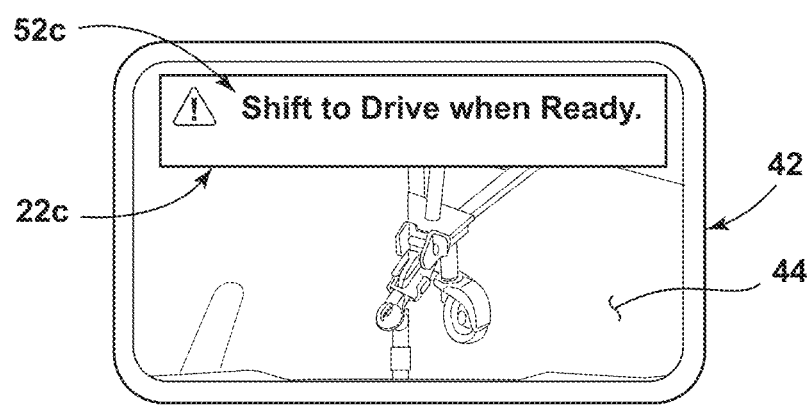
Figure 6D:
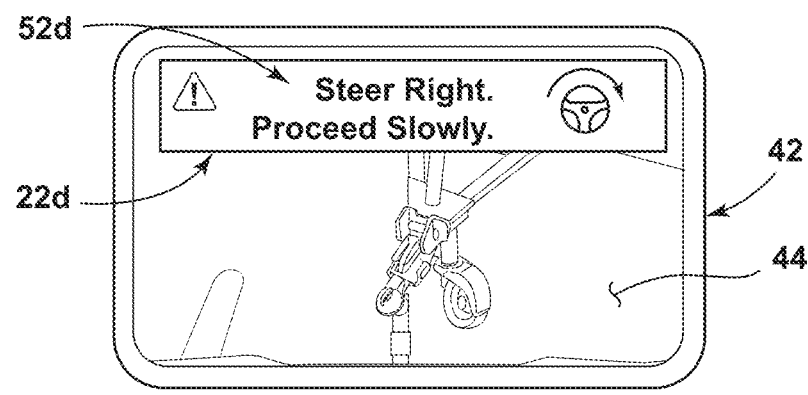

As shown in FIGS. 6A-6D, the coaching notification 22 may include a series of instructions 54 for particular actions to be taken, in sequence, to correct the situation and avoid trailer contact 14 with the object O. In particular, as shown in FIG. 6A, coaching notification 22 can initially include an instruction 54a to stop the vehicle 12 and shift the vehicle 12 into reverse. When system 10 determines that such action has been taken (such as using information from speed sensor 56 and/or the powertrain control system 58, which may be configured to communicate the status of switchgear 60), system 10 issues a subsequent instruction 54b (FIG. 6B) that indicates a reversing steering direction needed to move the trailer 14 away from the object O, which is generally the direction toward the side of the trailer 14 on which the object O is present. In some implementations, the notification 54b may instruct the driver to turn the steering wheel 62 to lock or may include an indication to turn the wheel in the necessary direction until the steering angle sensor 64 indicates that the steered wheels 28 are within a predetermined angle, for example, of the maximum steering angle $\delta_{max}$, at which point the instruction 54b can change to instruct the driver to maintain the steering position while reversing. When controller 26 determines that the reversing of vehicle 12 results in a current forward-driving corrective path 52 for the trailer 14 that is clear of the object O, controller 26 can present a further instruction 54c (FIG. 6C) indicating that the driver may begin forward driving, for example, by informing the driver that the driver may shift the vehicle 12 powertrain control system 58 to drive. When the vehicle 12 is in drive, a still further instruction 54d can be presented (FIG. 6D) that informs the driver that the steering direction should be reversed from that which was called for during backing of the vehicle 12 and trailer 14 combination (i.e. in the direction opposite the side of trailer 14 on which the object O is present) and may further include an indication that the vehicle 12 can be moved. In one implementation, the coaching notification 22 can remain persistent for a predetermined or otherwise calculated distance from the initiation of such forward driving, after which point, the notification 22 is deactivated. In variations of the system 10 described herein, the various indications and instructions 54 can be delivered in various sequences and/or combinations (i.e. in which some instructions are delivered simultaneously).

Figure 7:
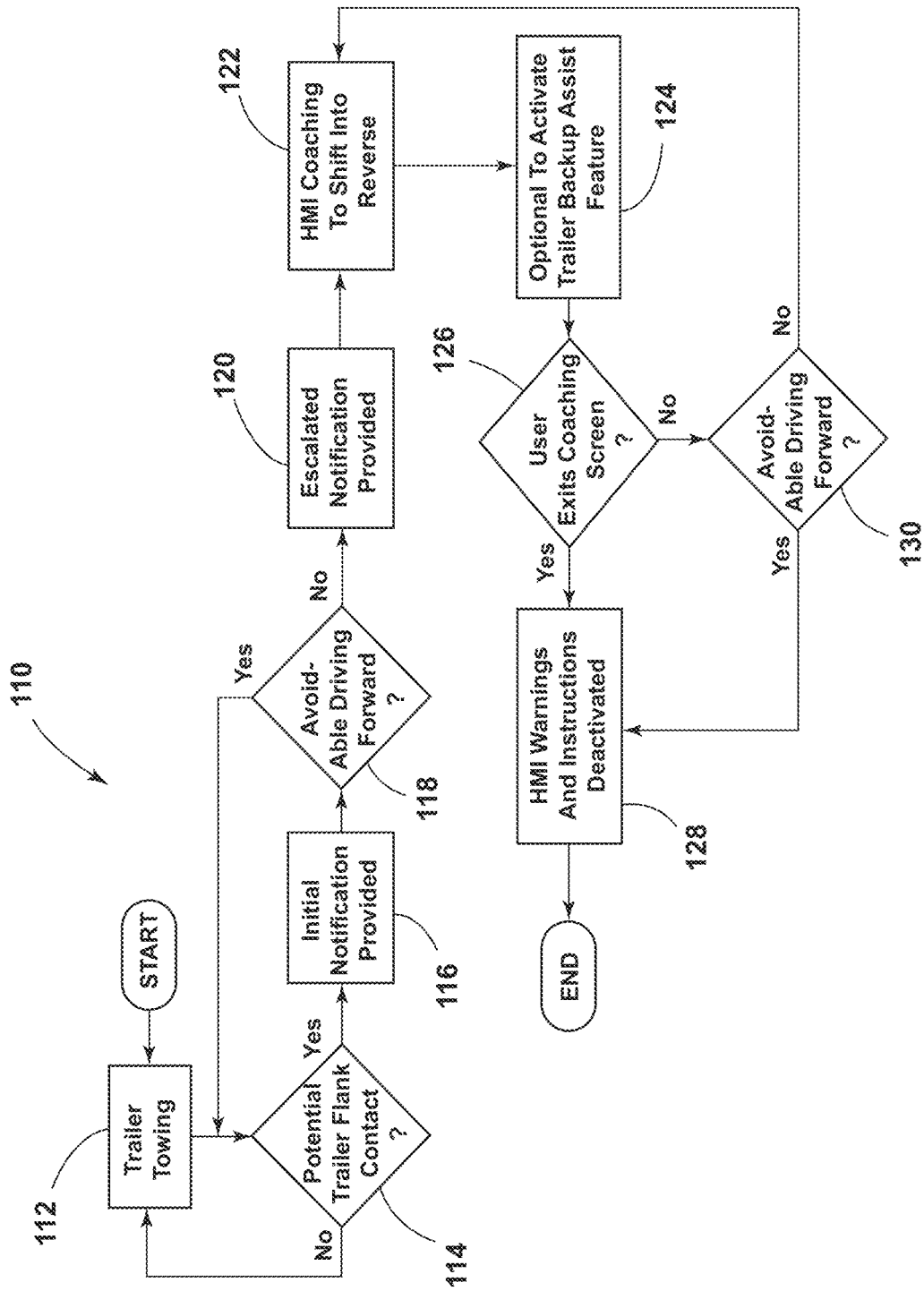
FIG. 7 is a flowchart depicting steps in a sequence or method for detecting a scenario where contact is avoidable only by reverse driving and issuing coaching notifications issued by the system to direct reversing of the vehicle to move the trailer away from the object.

Turning now to FIG. 7, an example of a method 110 for implementing an object avoidance routine 62 determining the various potential contact scenarios described above and issuing the appropriate coaching notification 22 that may be employed by system 10 is shown. As will generally be appreciated, the method 110 is implemented during normal driving of vehicle 12 while towing a trailer 14 (step 112). Accordingly, in one implementation, system 10 may activate upon a trailer being detected as being coupled with the vehicle 12, including by connection of the trailer 14 with the trailer electronic connector 68. The system detects when a trailer flank contact with an object O is anticipated (step 114). This is achieved by detecting and modeling the position of objects O with the surrounding environment through a fusion of data 22 from the vehicle 12 ultrasonic 76, radar 78, and camera 66 sensors, along with process steps to determine the trailer 14 position in conjunction with real-time vehicle dynamics data, including relative to objects O using data 22. As shown in FIG. 2, the vehicle may, in particular, employ a number of camera 66 and radar units 78 at various locations around the vehicle 12 to detect the entire surroundings of vehicle 12. The system 10 provides an initial notification 40 to the driver (step 116), to aid in the avoidance of the potential contact by oversteering around the detected obstacle O.

Figure 8:
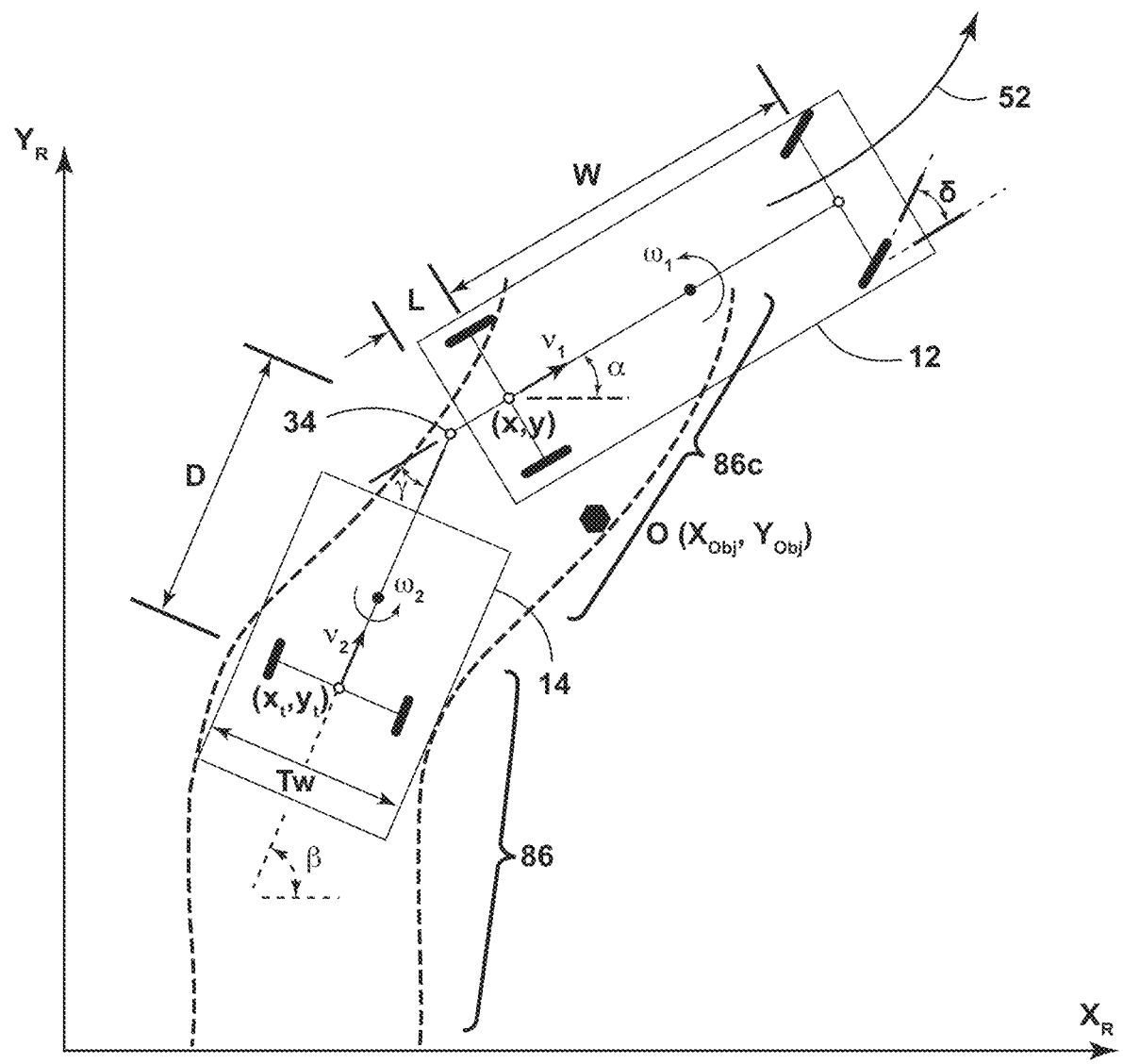
FIG. 8 is a kinematic model of a vehicle-trailer combination showing the determination of a trailer path, including a segment depicting a forward-driving corrective path intersecting an object.
Figure 9:
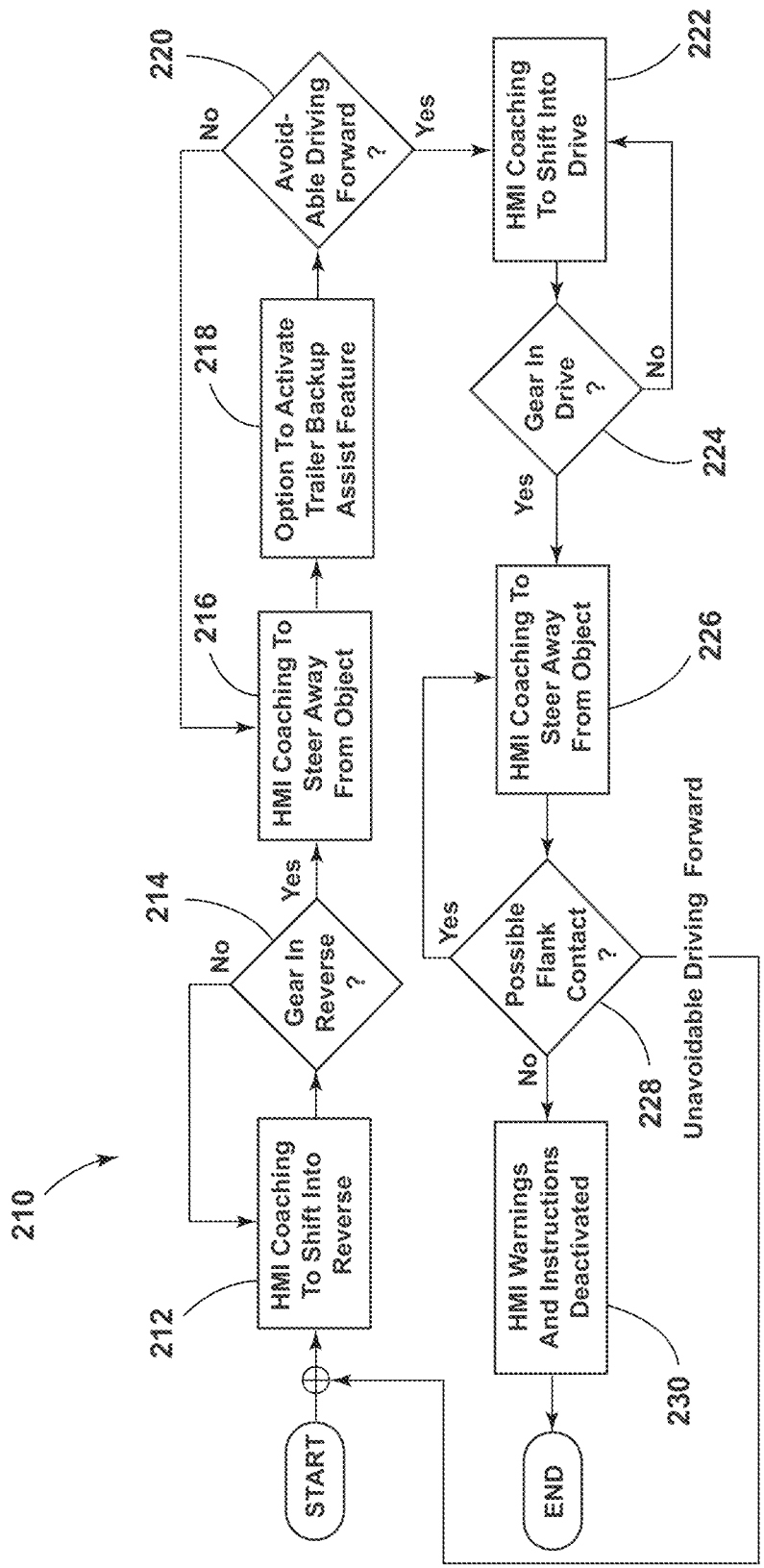
FIG. 9 is a flowchart depicting steps in an alternative sequence or method for issuing coaching notifications issued by the system to direct reversing of the vehicle to move the trailer away from the object.

As discussed above, the system 10, via controller 26, continues to track the position of the trailer 14 relative to the object O after delivering the initial notification 40 to determine if the trailer 14 contact is no longer avoidable by steering at or close to the appropriate maximum steering angle $\gamma_{max}$ during continued forward driving. This is achieved, initially, by modeling the trailer 14 trajectory along a trailer path 86 based on the vehicle 12 path 20, as shown in FIG. 8. As shown, during normal forward driving, the system 10 tracks the trailer path 86 along the current vehicle path 20. When object O is determined to be within the trailer path 86, the initial indication 40 is issued. The instantaneous path 86 of the trailer 14 corresponds with a width $T_w$ of the trailer 14 and is determined based on the current vehicle path 20. As further shown, after a potential contact is detected, controller 26 determines the trailer path 86c that corresponds with a corrective vehicle path 52 with a maximum steering angle $\gamma_{max}$ away from the detected object O. Once the position of the trailer 14 relative to the object O is such that the object O is within path $86_c$, the trailer 14 can no longer be towed clear of the object O during forward driving, and contact is considered unavoidable without backing trailer 14 away from the object O by reverse driving of vehicle 12.

To determine the path 86, $86_c$, controller 26 uses a measurement of the current vehicle speed $v_1$ determined, for example, using the wheel speed from speed sensor 56. Controller 26 also monitors the hitch angle γ, which can be determined using a trailer indication process 74 stored in memory 70 and accessible by controller 26. One example of such a process 74 is described in U.S. Pat. No. 9,340,228, the entire disclosure of which is hereby incorporated by reference herein. Additionally, the current vehicle 12 position (x, y) is received from the vehicle positioning system 80 and includes the vehicle heading angle α. When an object O is identified in data 22, the position of such obstacle ($x_{obj}$, $y_{obj}$) is determined. The length D of trailer 14 is known by system 10, including by being stored in memory 70 and associated with a particular trailer 14 (i.e. along with other trailer information 74) and/or estimated (for example, using the process described in U.S. Pat. No. 9,821,845, the entire contents of which are hereby incorporated by reference herein). Additionally, the distance L from the hitch ball 30 to vehicle rear vehicle axle 82 is known and stored in memory 70. The instantaneous trailer path 86 can be determined by using the current steering angle δ, as determined by the steering angle sensor 64. Similarly, the corrective trailer path 86c can be determined using a maximum steered wheel angle $\delta_{max}$ (which, for example may be between about 30° and 35°, controller 26 calculates a predicted vehicle yaw rate $\omega_1$ as ($v_1$ tan $\delta_{max}$)/WB. By setting the initial vehicle x-coordinate $x_0$ as x, the initial vehicle y-coordinate $y_0$ as y, the initial vehicle heading angle $\alpha_0$ as α, and determining the initial trailer heading angle $\beta_0$ as $\alpha_0+\gamma$, controller 26 uses the following equations to iteratively calculate the predicted trailer position $x_{(t, k+1)}$, $y_{(t, k+1)}$ and trailer heading $\beta_{(k+1)}$, where k is the time instant starting from 0:

$$\gamma_k = \beta_k - \alpha_k \tag{1}$$

$$\omega_{2,k} = -\frac{v_1 \cdot \sin\gamma_k + L \cdot \cos\gamma_k \cdot \omega_1}{D} \tag{2}$$

$$v_{2,k} = v_1 \cdot \cos\gamma_k - L \cdot \sin\gamma_k \cdot \omega_1 \tag{3}$$

$$x_{k+1} = x_k + v_1 \cdot \cos\alpha_k \cdot \Delta t \tag{4}$$

$$y_{k+1} = y_k + v_1 \cdot \sin\alpha_k \cdot \Delta t \tag{5}$$

$$\alpha_{k+1} = \alpha_k + \omega_1 \cdot \Delta t \tag{6}$$

-continued $$x_{t,k+1} = x_{t,k} + v_{2,k} \cdot \cos\beta_k \cdot \Delta t \quad (7)$$

$$y_{t,k+1} = y_{t,k} + v_{2,k} \cdot \sin\beta_k \cdot \Delta t \quad (8)$$

$$\beta_{k+1} = \beta_{k-1} + \omega_{2,k} \cdot \Delta t, \quad (9)$$

where $\Delta t$ is the sampling time. Using the above equations, controller 26 can predict the trailer trajectory $T_p$ in the next second by iterating the calculations in equations 1-9 until $k \geq (T_p/\Delta T)$. With $x_{(t,\ k+1)}$, $y_{(t,\ k+1)}$, $\beta_{(k+1)}$ for $k=(0, 1, 2, \dots)$, and the trailer parameters $T_w$ and D, controller 26 then finds the trailer path 86 or $86_c$ for the next second $T_p$. As discussed above, the presence of the object O at position $x_{obj}$, $y_{obj}$ within the path 20 indicates that contact between the trailer 14 and the object O is not avoidable by any further forward driving (step 118). When such a determination is made, the driver is informed of the impending contact using the coaching notifications 22 described above, along with (optionally) an audible indication (step 120). As discussed above, one coaching notification 22a can instruct the driver to shift into reverse (122). As discussed above, the coaching notification 22 may also indicate the direction of steering in reverse that is required to avoid contact with object O (which is simply the opposite of the current steering direction).

In one implementation of the method 110, the controller 26, upon issuing the coaching notification 22 may also provide an option for the driver to initiate a trailer backup assistance function 84 (step 124), whereby the controller 26 receives a steering command and adjusts the vehicle steering angle δ to maintain the trailer 14 along a path corresponding with the command during reversing of the vehicle 12. In a further implementation, the coaching notification 22 may be cleared or dismissed by the user or the notification 22 may be overridden by selection of another ADAS or trailer assistance system by the user (126), at which point the notification 22 is removed (step 128).

The controller 26 continues to monitor the surroundings of the vehicle 12 and the trailer angle γ, while using the same equations 1-9, above to determine corrective trailer path $86_c$ that reflect forward driving at an appropriate maximum steering angle $\delta_{max}$ (i.e., along a corrective vehicle path 52), until such a path $86_c$ is found that does not have the object O located therein, plus an additional clearance margin (step 130). When such a path 52 is found, the coaching notification 22 is removed from the display screen, and normal driving resumes (step 128).

In an alternate method 210, shown in FIG. 8, the coaching notification 22 can be provided in several stages. As shown, the system 10 implementing such method can monitor the status of switchgear 60 (step 212) and provide specific coaching notifications 22 in a required order. A coaching notification 22a to shift to reverse can be issued (step 214). When the vehicle 12 is determined to be in reverse, another notification 22b can be given indicating that the driver should steer in the direction opposition object O (step 216) with a subsequent option to activate TBA function 84 (step 218). Controller 26 can then monitor for the above-described condition in which corrective path 52 clears the object O (step 220). When such a condition is detected, the controller 26 issues a coaching notification 22 to shift the vehicle 12 into drive (step 222) followed by or simultaneously with an indication 22 to steer away from the object (step 224). During the subsequent forward driving, it is possible for the driver to move back into a potential contact scenario. Accordingly, controller 26 continues to monitor for a possible contact with object (e.g. using equations 1-9 above), indicating a return to an unavoidable contact situation (step 226). Upon such detect, the controller 26, essentially, repeats the sequence. If the trailer 14 clears the object O, the process ends (step 228).

It is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A trailer flank object contact avoidance system for a vehicle towing a trailer, comprising:
   a sensor system configured to detect objects in an operating environment of the vehicle; and
   a controller:
   processing information received from the sensor system to monitor a relative position of at least one object with respect to the vehicle during forward driving;

determining an instantaneous path of the trailer based on a vehicle steering angle and whether the instantaneous path of the trailer would bring the trailer into a potential contact with the at least one object by continued forward driving; and issuing a coaching notification to a driver that reverse driving is required to prevent the potential contact between the trailer and the vehicle when a corrective steering angle cannot prevent the potential contact of the trailer with the at least one object during forward driving.

2. The system of claim 1, wherein the controller issues an initial notification to the driver upon determining that the at least one object is within a threshold distance of a side of the trailer and that the instantaneous path of the trailer would bring the trailer into the potential contact with the at least one object by continued forward driving of the vehicle.

3. The system of claim 2, wherein the initial notification indicates the corrective steering angle to avoid the potential contact between the trailer and the vehicle during forward driving.

4. The system of claim 1, wherein the coaching notification includes an instruction to shift the vehicle into reverse and an indication of a reversing steering angle to move the trailer away from the object.

5. The system of claim 4, wherein the instruction and the indication in the coaching notification are delivered simultaneously.

6. The system of claim 4, wherein the instruction and the indication in the coaching notification are delivered sequentially.

7. The system of claim 4, wherein the coaching notification further includes a forward driving instruction including a forward driving instruction and an indication of a forward steering angle subsequently determined to continue to move the trailer away from the object.

8. The system of claim 1, wherein the instantaneous path of the trailer corresponds with a width of the trailer.

9. The system of claim 1, wherein the controller, upon issuing the coaching notification, provides a driver option to initiate a trailer backup assistance system, whereby the controller receives a steering command and adjusts the vehicle steering angle to maintain the trailer along a backing path corresponding with the steering command during reversing of the vehicle.

10. A vehicle, comprising:
a steering system including steered wheels; a
a sensor system configured to detect objects in an operating environment of the vehicle; and
a controller:
  processing information received from the sensor system to monitor a relative position of at least one object with respect to the vehicle during forward driving;
  determining an instantaneous path of a trailer coupled with the vehicle based on a steering angle of the steered wheels and whether the instantaneous path of the trailer would bring the trailer into a potential contact with the at least one object by continued forward driving; and
  issuing a coaching notification to the driver that reverse driving is required to prevent the potential contact between the trailer and the object when a maximum possible corrective steering angle does not result in a corrective trailer path that moves the trailer away from the object during forward driving.

11. The vehicle of claim 10, wherein the controller issues an initial notification to the driver upon determining that the object is within a threshold distance of a side of the trailer and that the instantaneous path of the trailer would bring the trailer into the potential contact with the at least one object by continued forward driving of the vehicle.

12. The vehicle of claim 11, wherein the initial notification indicates the corrective steering angle to avoid the potential contact between the trailer and the vehicle during forward driving.

13. The vehicle of claim 10, wherein the coaching notification includes an instruction to shift the vehicle into reverse and an indication of a reversing steering angle to move the trailer away from the object.

14. The vehicle of claim 13, wherein the instruction and the indication in the coaching notification are delivered simultaneously.

15. The vehicle of claim 13, wherein the instruction and the indication in the coaching notification are delivered sequentially.

16. The vehicle of claim 13, wherein the coaching notification further includes a forward driving instruction and an indication of a forward steering angle subsequently determined to continue to move the trailer away from the object.

17. A method for assisting a driver towing a trailer with a vehicle in avoiding contact between a flank of the towed trailer and an object, the method comprising:
  detecting at least one object in an operating environment of the vehicle;
  monitoring a relative position of the object with respect to the vehicle during forward driving;
  determining an instantaneous path of the trailer based on a vehicle steering angle and whether the instantaneous path of the trailer would bring the trailer into a potential contact with the at least one object by continued forward driving; and
  issuing a coaching notification to the driver that reverse driving is required to prevent a potential contact between the trailer and the object when a maximum possible corrective steering angle does not result in a corrective trailer path that moves the trailer away from the object during forward driving.

18. The method of claim 17, further including issuing an initial notification upon determining that the object is within a threshold distance of a side of the trailer and that the instantaneous path of the trailer would bring the trailer into the potential contact with the at least one object by continued forward driving of the vehicle.

19. The method of claim 18, wherein the initial notification indicates the corrective steering angle to avoid the potential contact between the trailer and the vehicle during forward driving.

20. The method of claim 17, wherein the coaching notification includes an instruction to shift the vehicle into reverse and indicates a reversing steering angle to move the trailer away from the object.

* * * * *